(12) United States Patent
Chheda et al.

(10) Patent No.: US 9,710,316 B1
(45) Date of Patent: Jul. 18, 2017

(54) FLEXIBLE SCRIPTING PLATFORM FOR TROUBLESHOOTING

(71) Applicant: Amazon Technologies, Inc., Seattle, WA (US)

(72) Inventors: Mahendra Manshi Chheda, Sammamish, WA (US); John Russell Lane, Spring Lake, MI (US); Morgan Zia Nichols, Seattle, WA (US); Oguz Mut, Redmond, WA (US); Bilal Quadri, Seattle, WA (US); Tyler Ricks Southwick, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 14/576,119

(22) Filed: Dec. 18, 2014

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |
| *G06F 3/0484* | (2013.01) |

(52) U.S. Cl.
CPC .......... *G06F 9/547* (2013.01); *G06F 3/04842* (2013.01); *G06F 8/31* (2013.01)

(58) Field of Classification Search
CPC ....................................................... G06F 9/547
USPC ........................................................ 719/320
See application file for complete search history.

(56) References Cited

U.S. PATENT DOCUMENTS

| | | |
|---|---|---|
| 8,131,860 B1 | 3/2012 | Wong et al. |
| 8,219,380 B1 | 7/2012 | Hosmer |
| 2003/0182463 A1 | 9/2003 | Valk |
| 2011/0078108 A1 | 3/2011 | Kumar |
| 2012/0041752 A1 | 2/2012 | Wang et al. |
| 2012/0110174 A1* | 5/2012 | Wootton ............... G06F 21/564 709/224 |
| 2012/0110448 A1* | 5/2012 | Jhoney ................ G06F 11/3466 715/704 |
| 2012/0167121 A1 | 6/2012 | Reierson et al. |
| 2013/0282892 A1 | 10/2013 | Levi et al. |
| 2014/0095272 A1 | 4/2014 | Zafiroglu et al. |
| 2014/0245134 A1 | 8/2014 | Portnoy et al. |
| 2014/0359009 A1* | 12/2014 | Shih ..................... H04L 67/306 709/204 |
| 2015/0095758 A1 | 4/2015 | Rossi et al. |

* cited by examiner

*Primary Examiner* — Timothy A Mudrick
(74) *Attorney, Agent, or Firm* — Davis Wright Tremaine LLP

(57) ABSTRACT

A scripting service may provide a scripting platform to users of the scripting service. The users may cause execution of various scripts and/or modify or generate new scripts associated with the scripting service. Execution of the various scripts may cause the scripting service to transmit application programming interface (API) calls to other services. The API calls may cause the other service to return data to the scripting service. The scripting service may then serialize the returned data and provide the serialized data to a particular user.

20 Claims, 11 Drawing Sheets

FLEXIBLE SCRIPTING PLATFORM FOR TROUBLESHOOTING

CROSS REFERENCE TO RELATED APPLICATION

This application incorporates by reference for all purposes the full disclosure of co-pending U.S. patent application Ser. No. 14/576,139, filed concurrently herewith, entitled "SECURE SCRIPT EXECUTION USING SANDBOXED ENVIRONMENTS."

BACKGROUND

The use of remote computing services, such as remote program execution and remote data storage, has greatly increased in recent years. Customers may reduce expenses and overhead by purchasing these services from a computing resource service provider. Customers of the computing resource service provider can communicate with computing systems, services and virtual machine instances which are widely distributed over many geographically dispersed networks. Customers, for instance, may communicate with computers of other customers to access and/or provide data while using services of a computing resource service provider. In many instances, customers configure and operate remote networks and remote computer systems using hardware managed by computing resource service providers, thereby reducing infrastructure costs and achieving other advantages. Networks often span multiple geographic boundaries connecting with other networks and connection errors may occur at various points along a communication path. The computer systems often utilize computing resources of various services offered by the computing resource service provider as well as computing resources operated by the customer. These computer systems may occasionally experience errors and other difficulties that can be resolved using support services or troubleshooting services. With such configurations of networks and computing resources, ensuring connectivity and operability between computing resources can be challenging, especially as the size and complexity of such networks and computer systems grow.

BRIEF DESCRIPTION OF THE DRAWINGS

Various embodiments in accordance with the present disclosure will be described with reference to the drawings, in which.

DETAILED DESCRIPTION

Figure 1:
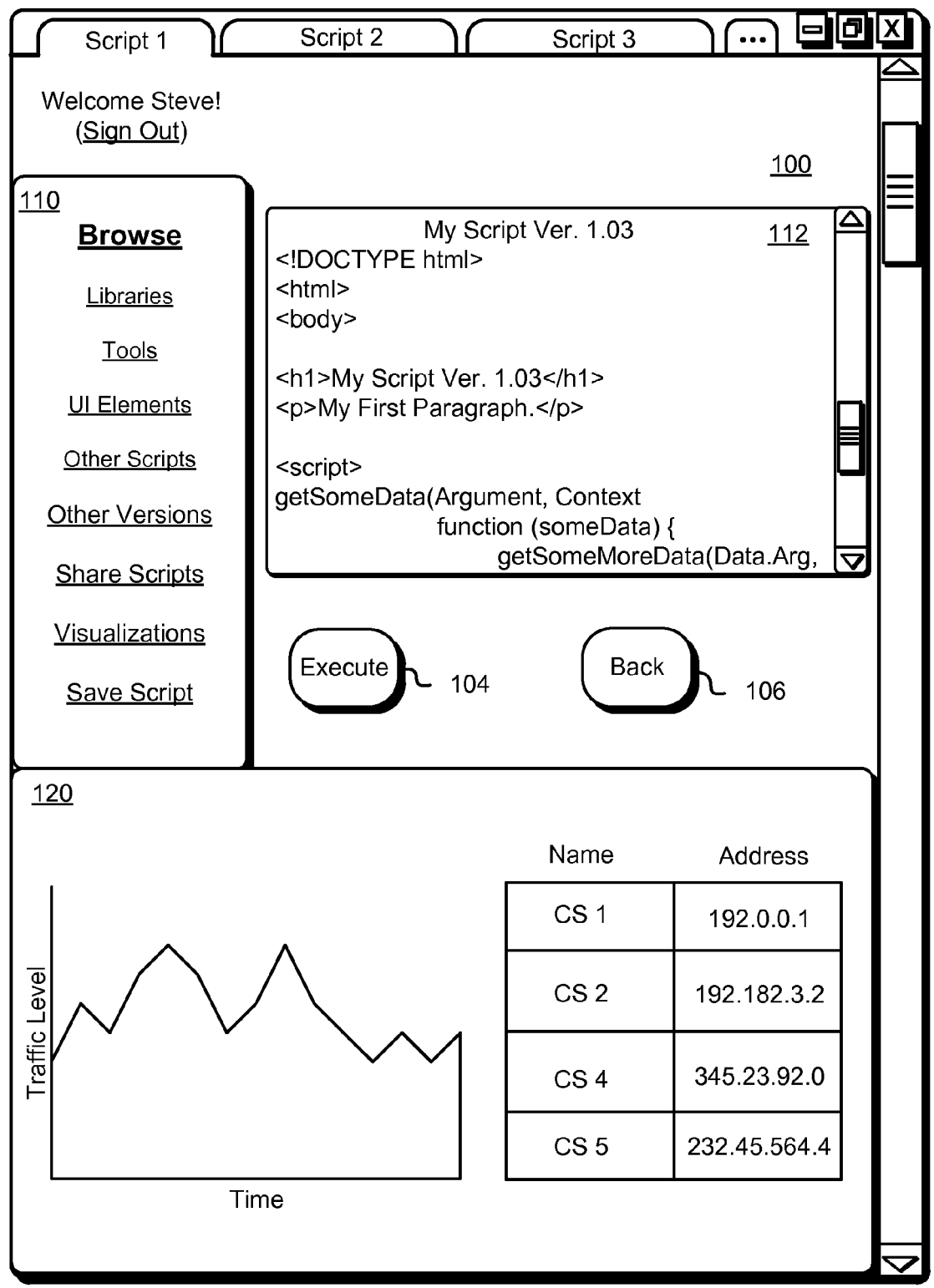
FIG. 1 is a diagram illustrating a webpage for generating a script useable to obtain data for display in various user interface elements in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements to scripting platforms suitable for creating information screens for technical troubleshooting by various services of a computing resource service provider or components thereof. The scripting platform may be provided by a scripting service of the computing resource service provider. The scripting service may provide various features such as client side script execution and/or server side script execution. The scripting service may enable JavaScript code or other executable instructions to be written by a user of the scripting service through an application of the user's computing device, such as a web browser or stand-alone application. The scripting service may check or otherwise process user created scripts for data accuracy. Furthermore, the user submitted scripts may be persisted by the scripting service or other service of the computing resource service provider and the scripting service may enable users to execute the scripts on computer systems operated by the computing resource service provider.

In various embodiments, users download scripts persisted by the scripting service, modify the executable instructions included in the scripts using an application of the users' computing devices, and execute the modified scripts in a secondary processing thread of the application. The scripts may cause the users' computing devices to perform a variety of operations. For example, execution of a particular script may cause a user's computing device to submit a set of application programming interface (API) calls to the computing resource service provider configured to obtain information corresponding to virtual machine instances associated with a customer of the computing resource service provider. Furthermore, the application may include various user interface elements configured to receive information obtained as a result of executing the scripts and display the information to the user. For example, the application may contain a graphing user interface element configured to display application plot of information using Cartesian or other coordinates. The user interface elements may be displayed in a variety of different ways such as in an overlay or side by side of a display area.

The scripting platform, provided by the scripting service, may enable users to perform asynchronous operations so that the user may interact with the user interface or user interface elements of the application while one or more scripts are executed in the background of the application and obtain additional information. In some embodiments, for example, the scripting platform may be provided in a web browser executed by the user's computing device, and the scripting platform may launch a web worker to execute user created scripts and obtain information from the service provider while enabling the user to continue interacting with the user interface of the web browser. Furthermore, the scripts may be executed in a sandboxed environment or sandboxed thread isolated from the execution of other components of the application. Returning to the example above, script execution may be performed by a web worker isolated from the main application thread of the web browser. The web worker may be configured to transmit information, such as API requests, to the computing resource service provider using Ajax or other asynchronous service calls. The scripting platform may provide a set of libraries to the user, and the libraries may contain API calls and other function calls that may be included in the user created scripts. In addition, the web workers may receive information as a result of transmitting API requests to the computing resource service provider, and the received information may be provided to the application through a communications channel. The application may then display the received information to the user using the one or more user interface elements described above.

FIG. 1 shows a webpage 100 which may be displayed by an application executed by a computing device enabling a user to interact with a scripting service operated by a computing resource service provider. The scripting service may be a collection of computing resources of the computing resource service provider configured to provide a scripting platform accessible to the user as the webpage 100. The scripting service may be a component of the support service described in greater detail below. In various embodiments, the scripting service may be a component of the computing resource service provider and may provide users the ability to create, modify, and execute scripts or other code configured to obtain information from the computing resource service provider and enable visualization of the obtained information for troubleshooting and support. As illustrated in FIG. 1, the webpage 100 includes various graphical user interface elements that enable navigation throughout the scripting platform website of which the webpage 100 is a part.

The webpage 100 may be displayed by various applications, such as a mobile application, stand-alone application, operating system component, or web browser. In this example, the webpage 100 includes various navigational features. For instance, on the left-hand side of the webpage 110, various links 110 may link to one or more other webpages that contain additional content corresponding to features of the scripting platform. The features may include various operations, information, or data provided to the user such as user interface elements, software libraries, share operation, save operation, or other tools. In this example, the links appear as textual words which enable the links to be selected using an appropriate input device such as a keyboard, mouse, touchscreen or other input device. Selection of one of the links 110 may cause an application displaying the webpage 100 to submit, pursuant to a URL associated with the selected link by the programming of the webpage 100, an HTTP request for the content associated with the link to a server that provided the webpage 100 or another server.

In this example, the webpage 100 also includes a graphical user element configured as a text input area 112. The text input area 112 may be a graphical user interface element of the webpage 100 where the underlying code of the webpage 100 is configured such that input from an input device causes information corresponding to the input received from the input device. For example, the user may generate an input using a keyboard connected to the computer system displaying webpage 100, and the input may be received by the application executing the underlying code of the webpage 100 and displayed in the text input area 112. The text input area may enable the user to interact with and/or generate scripts for use with the scripting service described above.

The webpage 100 may also include a graphical user element configured as an "execute" button 104. The execute button 104 may be a graphical user interface element of the webpage 100 where the underlying code of the webpage 100 is configured such that selection by an input device of the execute button 104 causes information corresponding to a script included in the text input area 112 to be executed. In various embodiments, the application executing the underlying code of the webpage 100 may launch a sandboxed thread, described in greater detail below, configured to execute the code included in the text input area 112. In yet other embodiments, the selection of the execute button may cause information corresponding to the text input area 112 to be transmitted to the scripting service for execution. For example, the selection of the execute button 104 may cause the application displaying the webpage 100 to submit, pursuant to a URL associated with the selected execute button 104 by the programming of the webpage 100, an HTTP request configured to cause the scripting service to execute code included in the text input area 112. The scripting service may then execute the code included in the text input area and provide information corresponding to a result of the execution of the code to the application displaying webpage 100. The scripting service may execute the code using computing resources of the computing resource service provider, as described in greater detail below.

The webpage 100 also includes a graphical user element configured as a "back" button 106. The back button 106 may be a graphical user interface element of webpage 100 where the underlying code of webpage 100 is configured such that the selection by an input device of the back button 106 causes the user to be redirected to one or more previously navigated webpages. The use of scripts in FIG. 1 is for illustrative purposes and any other executable code or executable instructions may be used in accordance with the present disclosure. The executable code may include an executable file or data which may cause a computer system to perform indicated tasks according to encoded instructions. Furthermore, in various embodiments, the computer system is required to parse the executable code in order to perform the indicated tasks according to the encoded instructions.

The webpage 100 may also include a graphical user element configured as a data visualization area 120. The data visualization area 120 may be a graphical user interface element of the webpage 100 where the underlying code of the webpage 100 is configured to display data obtained as a result of executing the script included in the text input area 112. Furthermore, the data visualization area 120 may display data according to user interface elements selected by the user as described in greater detail below. For example, as illustrated in FIG. 1, the user may select a user interface element configured as a graph plotting a traffic level over time. The script included in the text input area 112 may include executable code that, when executed by a computer system, causes the computer system to obtain information corresponding network traffic over an interval. The application displaying the webpage 100 may then receive the obtained information and cause the information to be displayed according to the user interface element described above.

Figure 2:
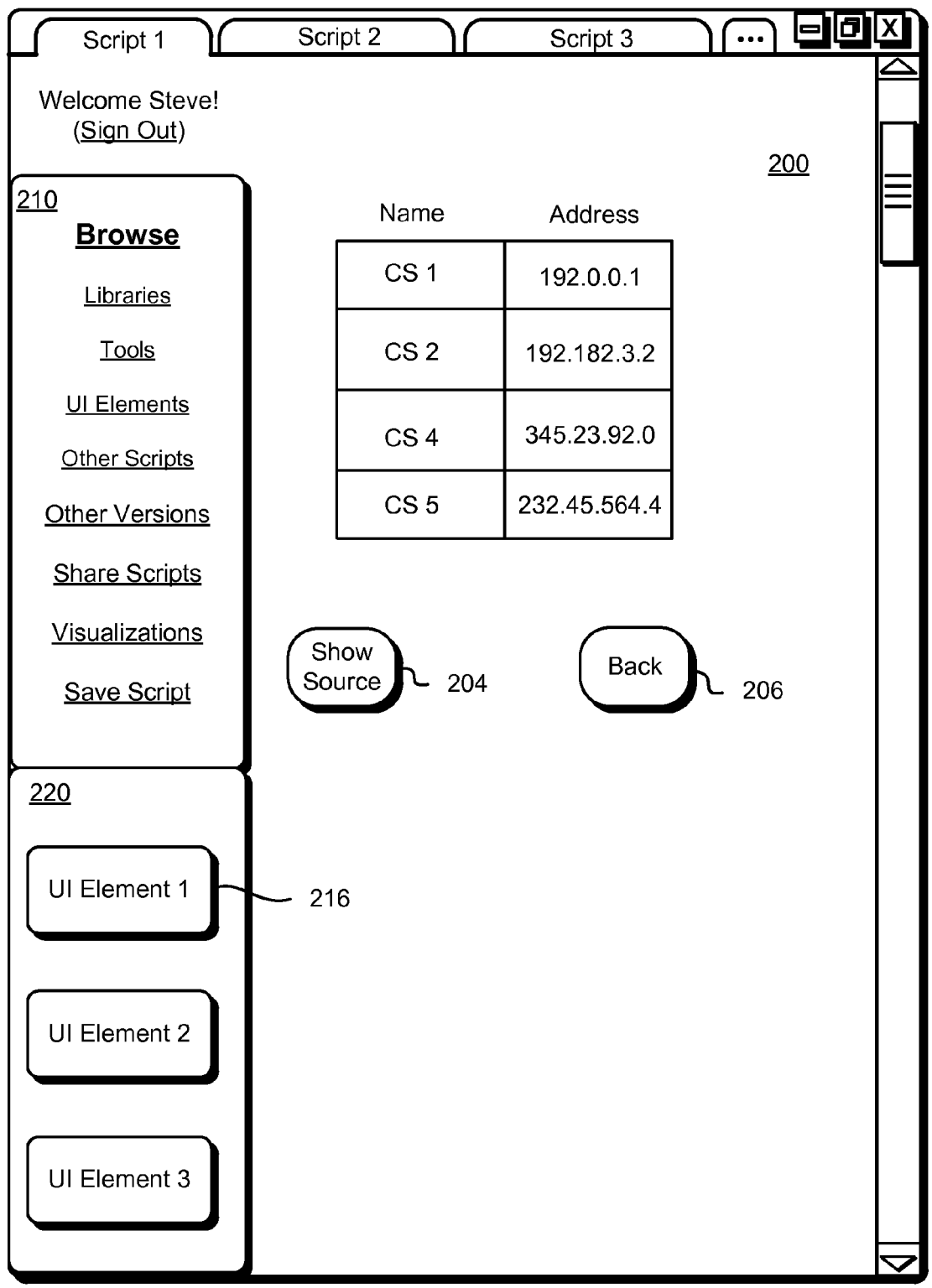
FIG. 2 is a diagram illustrating a webpage for selecting a script useable to obtain data for display in various user interface elements and modifying the selected script in accordance with an embodiment.

FIG. 2 shows a webpage 200 which may be displayed by an application executed by a computing device enabling a user to interact with a scripting service operated by a computing resource service provider. The scripting service may be a component of the support service described in greater detail below. In various embodiments, the scripting service may be a component of the computing resource service provider and may provide users the ability to create, modify, and execute scripts or other code configured to obtain information from the computing resource service provider and enable visualization of the obtained information for troubleshooting and support. As illustrated in FIG. 2, the webpage 200 includes various graphical user interface elements that enable navigation throughout the scripting platform website of which the webpage 200 is a part.

The webpage 200 may be displayed by various applications, such as a mobile application, stand-alone application, operating system component, or web browser. In this example, the webpage 200 includes various navigational features. For instance, on the left-hand side of the webpage 210, various links 210 may link to one or more other webpages that contain additional content corresponding to features of the scripting platform. The features may include various operations, information, or data provided to the user such as user interface elements, software libraries, share operation, save operation, or other tools. In this example, the links appear as textual words which enable the links to be selected using an appropriate input device such as a keyboard, mouse, touchscreen or other input device. Selection of one of the links 210 may cause an application displaying the webpage 200 to submit, pursuant to a URL associated with the selected link by the programming of the webpage 200, an HTTP request for the content associated with the link to a server that provided the webpage 200 or another server.

The webpage 200 may also include a graphical user element configured as an "show source" button 204. The show source button 204 may be a graphical user interface element of webpage 100 where the underlying code of the webpage 100 is configured such that selection by an input device of the show source button 204 causes information corresponding to a script used to display data in the webpage 200 to be obtained by the application and displayed to the user. In various embodiments, the application executing the underlying code of the webpage 100 may have access to the source code as a result of executing the script in order to display data in the webpage 100. In yet other embodiments, the data displayed in the webpage 100 may be illustrative and/or descriptive of the script and corresponding source code. For example, the user may browse a collection of scripts including descriptions of the operations performed by the scripts. The selection of the show source button 204 may cause the application displaying the webpage 200 to submit, pursuant to a URL associated with the selected show source button 204 by the programming of the webpage 200, an HTTP request configured to obtain, from the scripting service or data repository, the source code corresponding to a particular script indicated by the HTTP request. The scripting service may then determine the latest version of the particular script and provide the latest version of the script to the application. For example, the scripting service may provide a URL or other link to a storage location of the particular script.

The webpage 200 also includes a graphical user element configured as a "back" button 206. The back button 206 may be a graphical user interface element of webpage 200 where the underlying code of webpage 200 is configured such that the selection by an input device of the back button 206 causes the user to be redirected to one or more previously navigated webpages. The use of source code in FIG. 2 is for illustrative purposes and any other executable code or executable instructions may be used in accordance with the present disclosure. The source code may include a collection of computer instructions (possibly with comments) written using a human-readable computer language, usually as text, such as JavaScript. Furthermore, the webpage 100 may be part of a single-page application (SPA), and the SPA may be a web application or website that fits on a single webpage, where all necessary code (e.g., HTML, JavaScript, and Cascading Style Sheets (CSS)) is retrieved with a single-page load of webpage 100.

The webpage 100 may also include a graphical user element configured as a data visualization area 120. The data visualization area 120 may be a graphical user interface element of the webpage 100 where the underlying code of the webpage 100 is configured to display data according to one or more use interface elements 216. The user interface elements 216 may define a data visualization format for at least a portion of the webpage 200. For example, the user interface element 216 may define a graph or overlay which may be used to display data obtained by a script.

Figure 3:
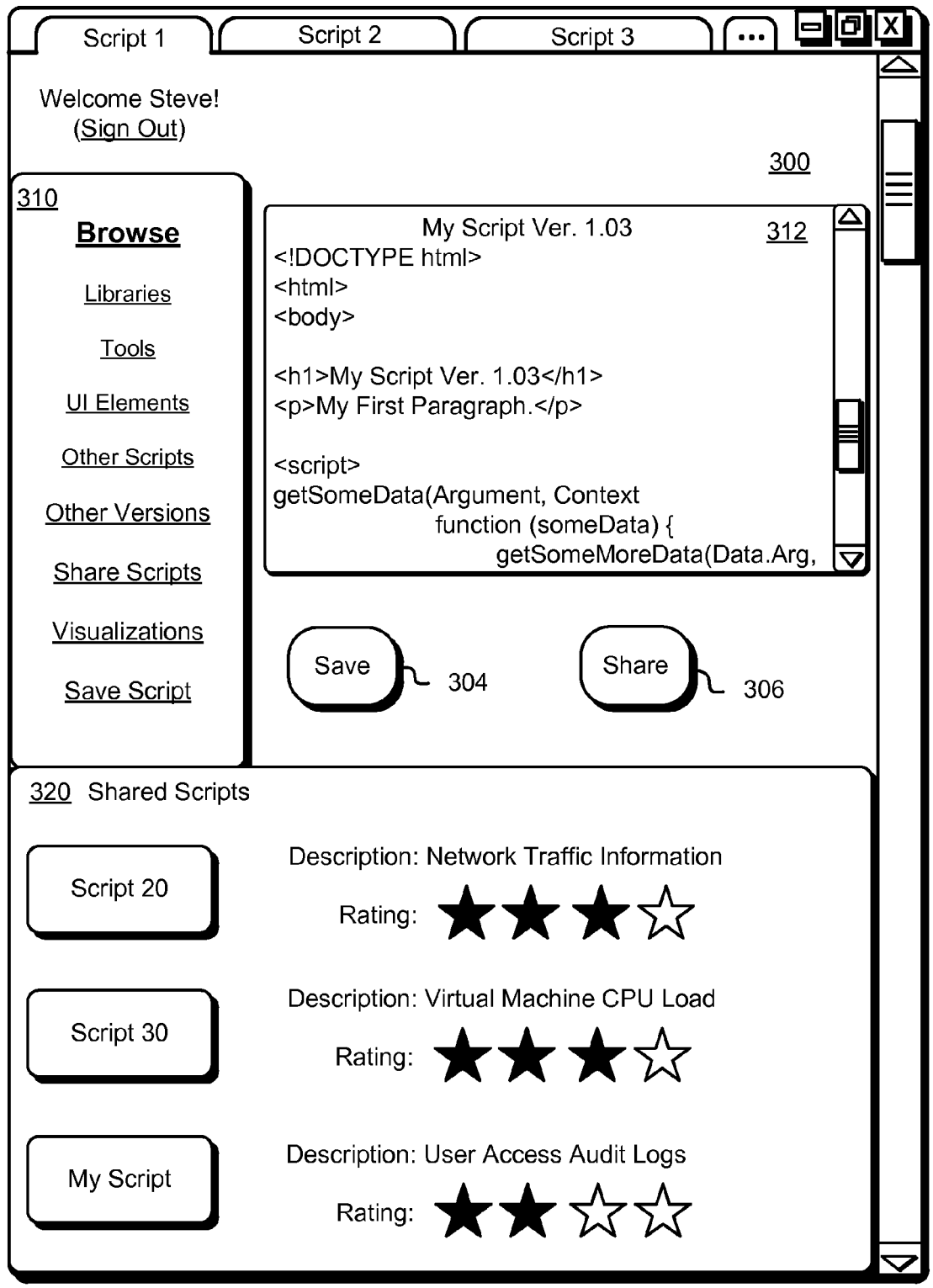
FIG. 3 is a diagram illustrating a webpage for modifying a script useable to obtain data for display in various user interface elements and sharing and/or storing the modified script in accordance with an embodiment.

FIG. 3 shows a webpage 300 which may be displayed by an application executed by a computing device enabling a user to interact with a scripting service operated by computing resource service provider. The scripting service may be a component of the support service described in greater detail below. In various embodiments, the scripting service may be a component of the computing resource service provider and may provide users the ability to create, modify, and execute scripts or other code configured to obtain information from the computing resource service provider and enable visualization of the obtained information for troubleshooting and support. As illustrated in FIG. 3, the webpage 300 includes various graphical user interface elements that enable navigation throughout the scripting platform website of which the webpage 300 is a part.

The webpage 300 may be displayed by various applications, such as a mobile application, stand-alone application, operating system component, or web browser. In this example, the webpage 300 includes various navigational features. For instance, on the left-hand side of the webpage 310, various links 310 may link to one or more other webpages that contain additional content corresponding to features of the scripting platform. The features may include various operations, information, or data provided to the user such as user interface elements, software libraries, share operation, save operation, or other tools. In this example, the links appear as textual words which enable the links to be selected using an appropriate input device such as a keyboard, mouse, touchscreen or other input device. Selection of one of the links 310 may cause an application displaying the webpage 300 to submit, pursuant to a URL associated with the selected link by the programming of the webpage 300, an HTTP request for the content associated with the link to a server that provided the webpage 300 or another server.

In this example, the webpage 300 also includes a graphical user element configured as a text input area 312. The text input area 312 may be a graphical user interface element of the webpage 300 where the underlying code of the webpage 300 is configured such that input from an input device causes information corresponding to the input received from the input device. For example, the user may generate an input using a keyboard connected to the computer system displaying webpage 300, and the input may be received by the application executing the underlying code of the webpage 300 and displayed in the text input area 312. The text input area may enable the user to interact with and/or generate scripts for use with the scripting service described above.

The webpage 300 may also include a graphical user element configured as a "save" button 304. The save button 304 may be a graphical user interface element of the webpage 300 where the underlying code of the webpage 300 is configured such that selection by an input device of the save button 304 causes information corresponding to a script to be persisted. In various embodiments, the application executing the underlying code of the webpage 300 may cause the script displayed in webpage 300 to be stored in a data storage device connected to the computing device executing the application, such as a hard disk drive. Furthermore, the script may be stored in such a way that the script is associated with the application. In yet other embodiments, the selection of the save button may cause information corresponding to the script to be transmitted to the scripting service for storage. For example, the selection of the save button 304 may cause the application displaying the webpage 300 to submit, pursuant to a URL associated with the selected execute button 304 by the programming of the webpage 300, an HTTP request configured to cause the scripting service to store the script in a data storage service.

The webpage 300 also includes a graphical user element configured as a "share" button 106. The share button 106 may be a graphical user interface element of webpage 300 where the underlying code of webpage 300 is configured such that the selection by an input device of the share button 306 causes the script included in the text input area. For example, the user may generate a script by at least inputting source code into the text area and share the script with other users of the scripting service. Sharing the script with other users of the scripting service may include a variety of different operations. For example, the selection of the share button 306 may cause the application to transmit the script to the computing resource service provider or component thereof such as the scripting service. The scripting service may process the script in order to determine one or more attributes of the script, such as a version number, a programming language of the script, a service of the computing resource service provide associated with the script, or other information suitable for sharing the script. Additionally, the user may select particular users to share the script with. In various embodiments, after the user has selected the share button 306 the script is checked by another user, such as an administrator, prior to the scripting service providing the shared script to another user.

Figure 4:
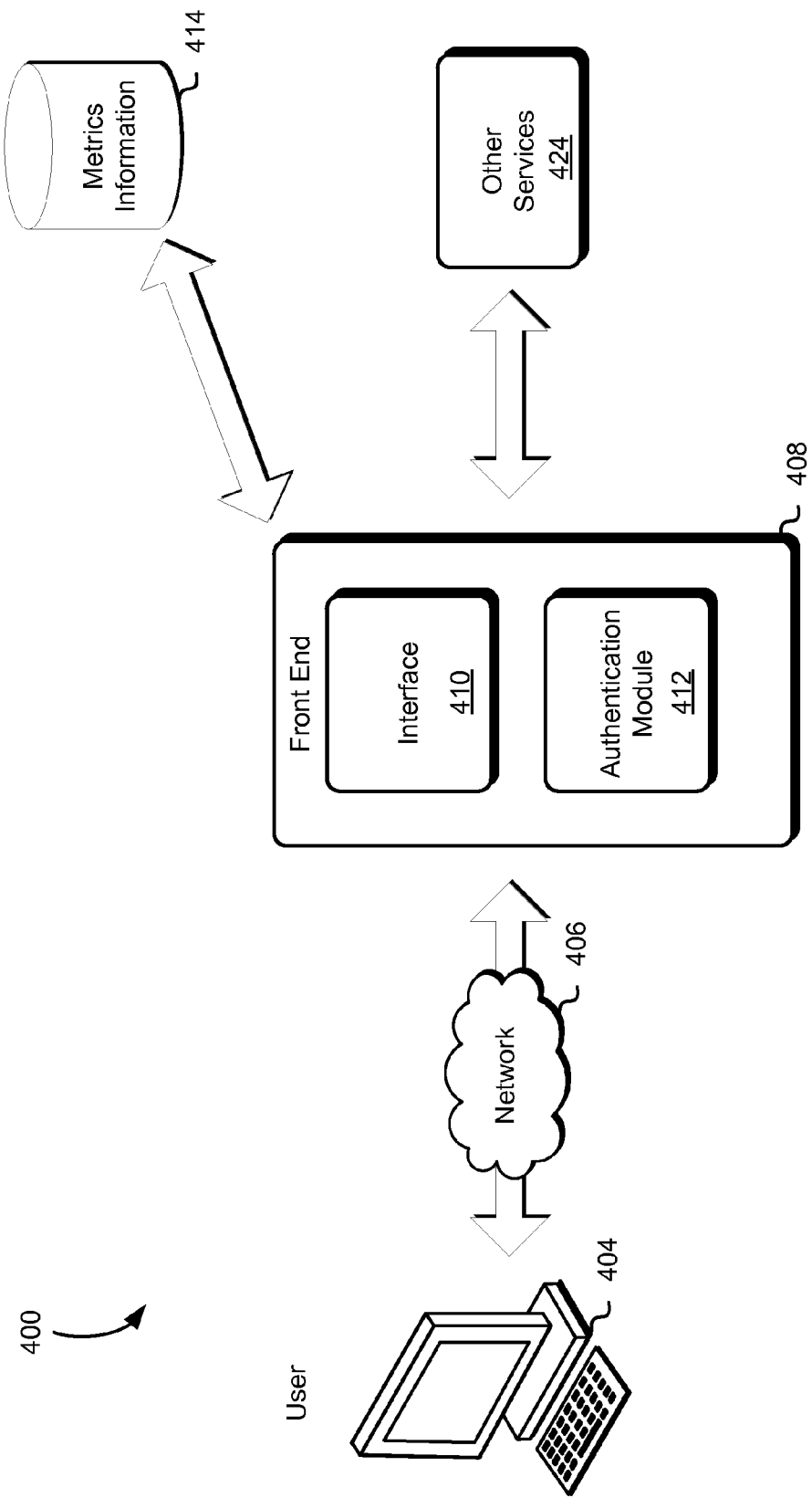
FIG. 4 is an environment illustrating a user interacting with a scripting service provided by a computing resource service provider in accordance with an embodiment.

The webpage 300 may also include a graphical user element configured as a script browser 320. The script browser 120 may be a graphical user interface element of the webpage 300 where the underlying code of the webpage 300 is configured to display a set of scripts to the user including, as illustrated by FIG. 3, a description of the script and a rating of the script. Furthermore, the script browser 120 may display additional information such as a version of the script and an author of the script. In various embodiments, when the user selects, using an input device, a script from the script browser 320, the application causes the script to be displayed in the text input area 312 thereby enabling the user to interact with the script FIG. 4 shows an example of an environment 400 in which a user is connected to a scripting service of a computing resource service provider in accordance with at least one embodiment. The computing resource service provider may provide the scripting service to the user 404 and the user 404 may communicate with the scripting service via an interface 410 of a front end 408 computer system of the scripting service. The interface 410 may be a web services interface or any other type of customer interface. The user 404 may be an organization that may utilize the scripting service to provide a scripting platform to enable the user to provide customer support for other organizations or entities. Additionally, the user 404 may be an individual that utilizes the scripting service to generate and execute scripts. As shown in FIG. 4, the user 404 may communicate with the scripting service and front end 408 through a network 406, whereby the network 406 may be a communication network, such as the Internet, an intranet or an Internet service provider (ISP) network. Some communications from the user 404 to the interface 410 may cause the front end 408 to operate in accordance with one or more embodiments described herein or a variation thereof.

The front end 408 may be a computer system configured to enable a user to interact with the scripting service. For example, the front end 408 may be a web server or other computer server system. As illustrated in FIG. 4, the front end 408, in various embodiments, includes an authentication module 412. The authentication module 412, in an embodiment, is a computer system (i.e., collection of computing resources) configured to perform operations involved in authentication of users of the scripting service. Furthermore, the authentication module 412 may also be configured to authenticate the user to other services of the computing resource service provider. For example, the user may use the scripting platform to troubleshoot an issue for a customer of the computing resource service provider. The authentication module may be configured to authenticate the user as well as obtain authentication tokens associated with the customer so that the scripting service may include the obtained authentication tokens in an API call to one or more other services of the computing resource service provider 424. Furthermore, the front end 408 may collect metric information 414 corresponding to user's interactions with the scripting service. The metrics information 414 may include a number of requests submitted by a particular user, information corresponding to a computing device operated by the user, or any other information obtained by the front end 408.

Figure 5:
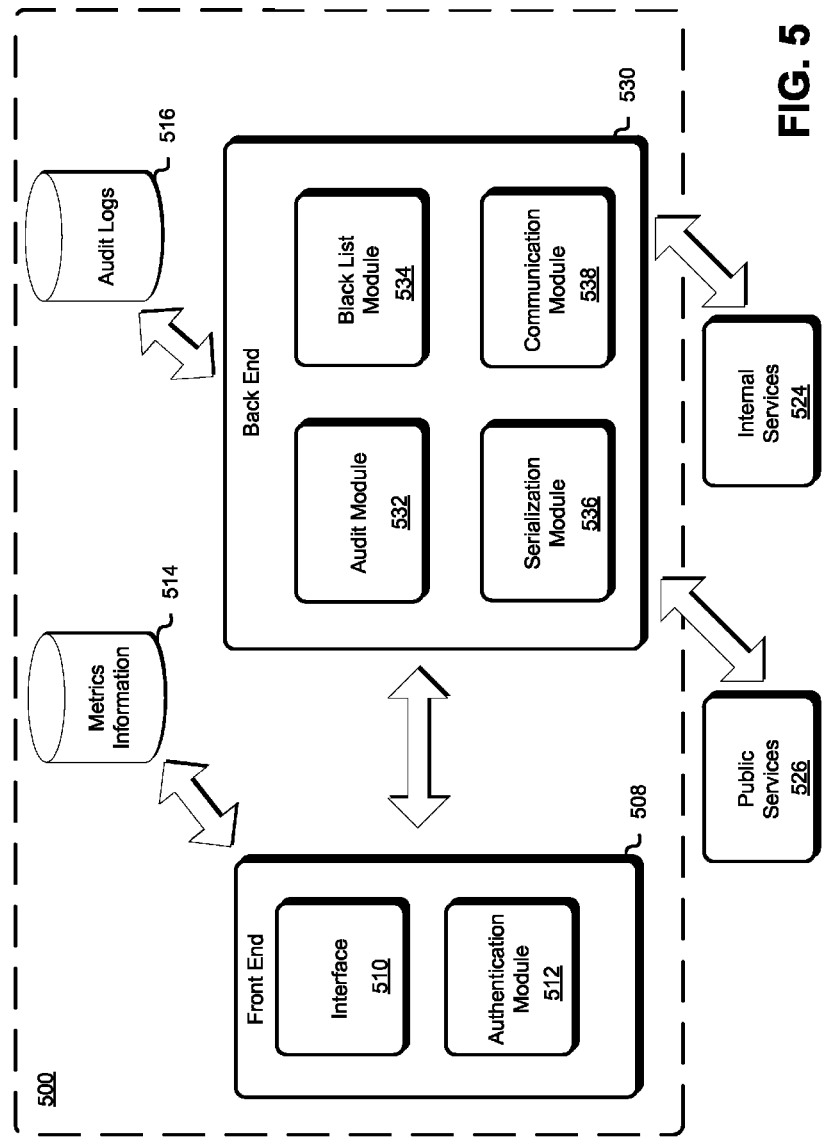
FIG. 5 is an environment illustrating a scripting service provided by a computing resource service provider in accordance with an embodiment.

FIG. 5 shows an example of a scripting service 500 of a computing resource service provider in accordance with at least one embodiment. The computing resource service provider may provide the scripting service 500 to the user and the user may communicate with scripting via an interface 510 of a front end 508 computer system of the scripting service as described above. The scripting service 500 may provide a scripting platform to users of the computing resource service provider exposed as a website through the front end 508. Additionally, the front end 508 may include an authentication module 512 as described above. In various embodiments, the front end 508 is further configured to obtain metrics information 514 from user requests received at the interface 510. The metrics information 514 may be stored in a storage device of the front end 508 or a storage service of a data storage service described in greater detail below.

The scripting service 500 may include various components, such as computing resource and/or modules, in order to provide the users with the scripting platform. The components of the scripting service 500, in the example illustrated in FIG. 5, include a back end 530 computer system including an audit module 532, a blacklist module 534, a serialization module 536, and a communications module 538. The front end 508 may be configured to receive requests via the interface 510 from the users and provide the requests, once authenticated, to the back end 530. The back end may be a computer system configured to process user requests generated by the user interacting with the scripting platform. For example, the back end 530 may be a computer server or virtual computer server.

The audit module 532 may be a collection of computing resources configured to obtain audit information from requests and cause the information to be stored in an audit log 516. The audit information may allow the scripting service 500 to throttle users requests. Additionally the blacklist module 534 may be a collection of computing resources configured to prevent the scripting service 500 from processing certain user requests. For example, the blacklist module 534 may contain a set of API calls and arguments that if executed by one or more internal services 524 or public services 526 may return a sufficiently large data set as to cause a degradation in performance of the computing resource of the scripting service 500, the public services 526, or internal services 524. For example, a customer account associated with the API call may have a large number of users and the API call may be attempting to return information corresponding to every user. In another, For example, a customer account associated with the API call may have a large number of resources and the API call may be attempting to return information corresponding to every resource. The public service 526 may be a service access over a public network such as the Internet. For example, the public service 526 may include a public Domain Name System (DNS) server. The internal services 526 may be services of the computing resource service provider providing the scripting service 500. Furthermore, the audit module 532 may determine information corresponding to scripts provided by users of the scripting service. For example, the audit module may determine at least one other service associated with the script based at least in part on APL calls included in the script. The audit module may use machine learning or other mechanisms to determine information about the script. Additionally, the script service may determine a frequency various scripts are executed or obtained from the scripting service. The scripting service may use this information to provide users with recommendations of scripts or an indication of scripts that may be useful to a particular user.

The communications module 538 may be a collection of computing resources configured to send and receive data from the internal services 524 and public service 526. For example, a particular request may include an API call to an internal service 524, and the communications module 538 may then provide the API call and an authentication token to the service indicated in the request. In another example, the communications module 538 may generate an appropriately configured API call based at least in part on information included in the request. The communications module 538 may also receive data corresponding to API calls to the internal service 524 and the public service 526. For example, the communications module 538 may transmit, to a virtual machine service, an API call for information corresponding to a set of virtual computing systems associated with a customer of the computing resource service provider, such as identification information or location information corresponding to the set of virtual computing systems. The communications module 538 may then receive, in response to the request, the information corresponding to the set of virtual computing systems. The communications module 538 may provide the obtain information serialization module 536.

The serialization module 536 may be a collection of computing resources configured to serialize information obtained by the communications module. The serialization module 536 may serialize data obtained from the communications module 538 or other component of the scripting service 500 into a structured format (e.g., JSON, XML, SecPol, Amazon Web Services Access Policy Language etc.) to create serialized data. The serialization module 536 may serialize data into a format suitable for the application such that the application may de-serialize the data and display the data to the user in one or more user interface elements selected by the user, such as the graph illustrated in FIG. 1.

Figure 6:
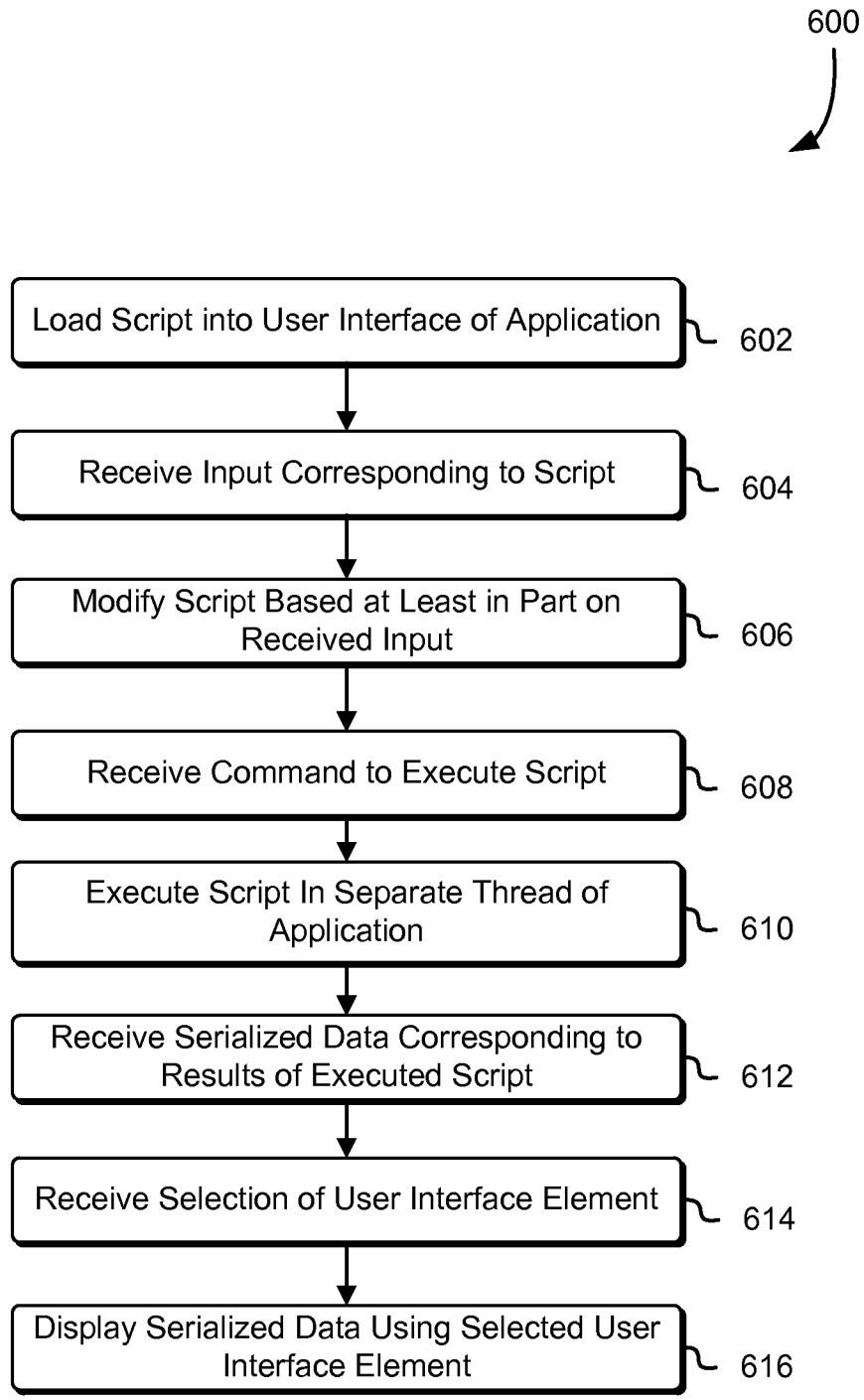
FIG. 6 illustrates an example process for interacting with a scripting service in order to obtain data for display in various user interface elements in accordance with an embodiment.

FIG. 6 shows an illustrative example of the process 600 which may be used to execute a script using a scripting platform implemented by a scripting device in accordance with an embodiment. The process 600 may be performed by any suitable system, such as the user computing device and the scripting service described above in connection with FIGS. 4. Returning to FIG. 6, in an embodiment, the process 600 includes loading a script into a user interface element of an application 602. The application may be a web browser application as described above. Furthermore, loading the script may include providing human-readable text of the script to a user interface element of the application, such as a text input area of the application described above.

The application may then receive an input corresponding the script 604. For example, the user may utilize a keyboard connected to the user's computing device in order to modify the script included in the text input area. The application may then modify the script based at least in part on the received input 606. For example, the user may generate the script using an input device and the generated script may appear in a display area of the application as the user in providing input corresponding to the script to the application. In numerous variations to the process 600, the user may simply select a script for execution without modification to the script. Returning to FIG. 6, the application may then receive a command to execute the script 608. As described above, the application may include a user interface element configured as an execute button. In response to the received command, the application my cause the user's computing device to execute the script in a distinct execution thread or process of the application 610. For example, the application may cause the computing device to execute a web worker in order to execute the script in a sandboxed environment isolated from the main thread of the application. In yet other variations to the process 600, the application may provide the script to the scripting service for execution using computing resources of a computing resource service provider. Furthermore, execution of the script may cause one or more request to be transmitted to the scripting service. For example, execution of the script may cause an Ajax call corresponding to an API call to a service of the computing resource service provider to be transmitted to the scripting service.

The application may, as a result of the execution of the script, receive serialized data from the scripting service 612. As described above, the scripting service may receive data from one or more other services as a result of an API call to the one or more services, where the API call is a result of execution of the script. The application may then receive a selection of a user interface element 614. The selection may be received from the user and may correspond to the received serialized data. For example, if the received serialized data includes names and address, the application may provide the user with a selection of user interface elements including tables. The application may then cause the computing device to display the serialized data using the selected user interface element. As described above, the user interface element may define a format for displaying the serialized data, and the application may then de-serialize the data causing a display device of computing device to display the de-serialized data according to the format defined in the user interface element.

Figure 7:
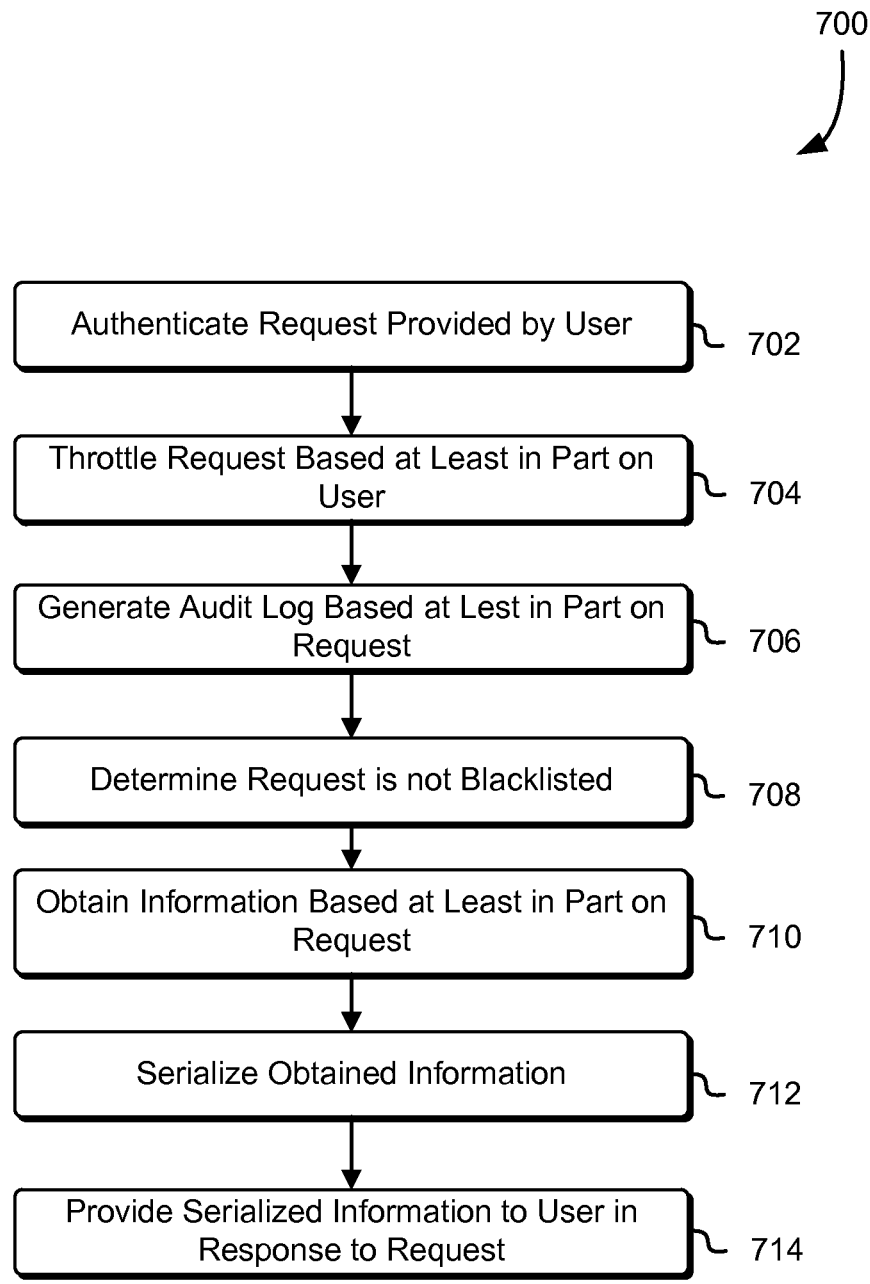
FIG. 7 illustrates an example process for providing data to a user for display in various user interface elements in accordance with an embodiment.

FIG. 7 shows an illustrative example of the process 700 which may be used to execute a script using a scripting platform implemented by a scripting device in accordance with an embodiment. The process 700 may be performed by any suitable system, such as the user the scripting service described above in connection with FIG. 5. Returning to FIG. 7, in an embodiment, the process 700 includes authenticating a request provided by a user through a computing device 702. As described above, the scripting platform provided by the scripting service may enable a user to execute a script on the user's computing device configured to transmit request to the scripting service. The scripting service may include an authentication module to authenticate received user request. In another example, the scripting service may utilize an authentication service of the computing resource service provider in order to authenticate received user requests.

The scripting service may then determine to throttle the request and/or user responsible for submitted the request based at least in part on the user associated with the request 704. For example, if the number of requests received from the user is over a threshold over an interval the scripting service may throttle the request by at least buffering the request for a defined interval of time before processing the request. The scripting service may also generate audit log information based at least in part of the request 706. For example, the scripting service may determine a user associated with the request and data indicated in the request. The determined information may be stored in an audit log enabling review and monitoring of the operations of the users of the scripting service. The scripting service may also determine if the request is not blacklisted 708. Particular requests or arguments included in the request may be blacklisted such that the request is not processed by the scripting service. If the request is blacklisted the scripting service may terminate processing of the request and provide a notification to the user.

Once the scripting service has determined the request is not blacklisted, the scripting service may obtained information based at least in part on the request 710. For example, the request may be configured to cause the scripting service to transmit an API request to another service of the computing resource service provider, and the scripting service may then receive, as a result of the API call, data from the other service. The scripting service may then serialize the obtained data 712. The data may be serialized into a structured format indicated by the user in the request. The format may be suitable for an application operated by the user to obtain the data from the serialized data. The scripting service may then provide the serialized information to the user in response to the request 714. For example, the scripting service may transmit the serialized information over a network to a computing device operated by the user.

Figure 8:
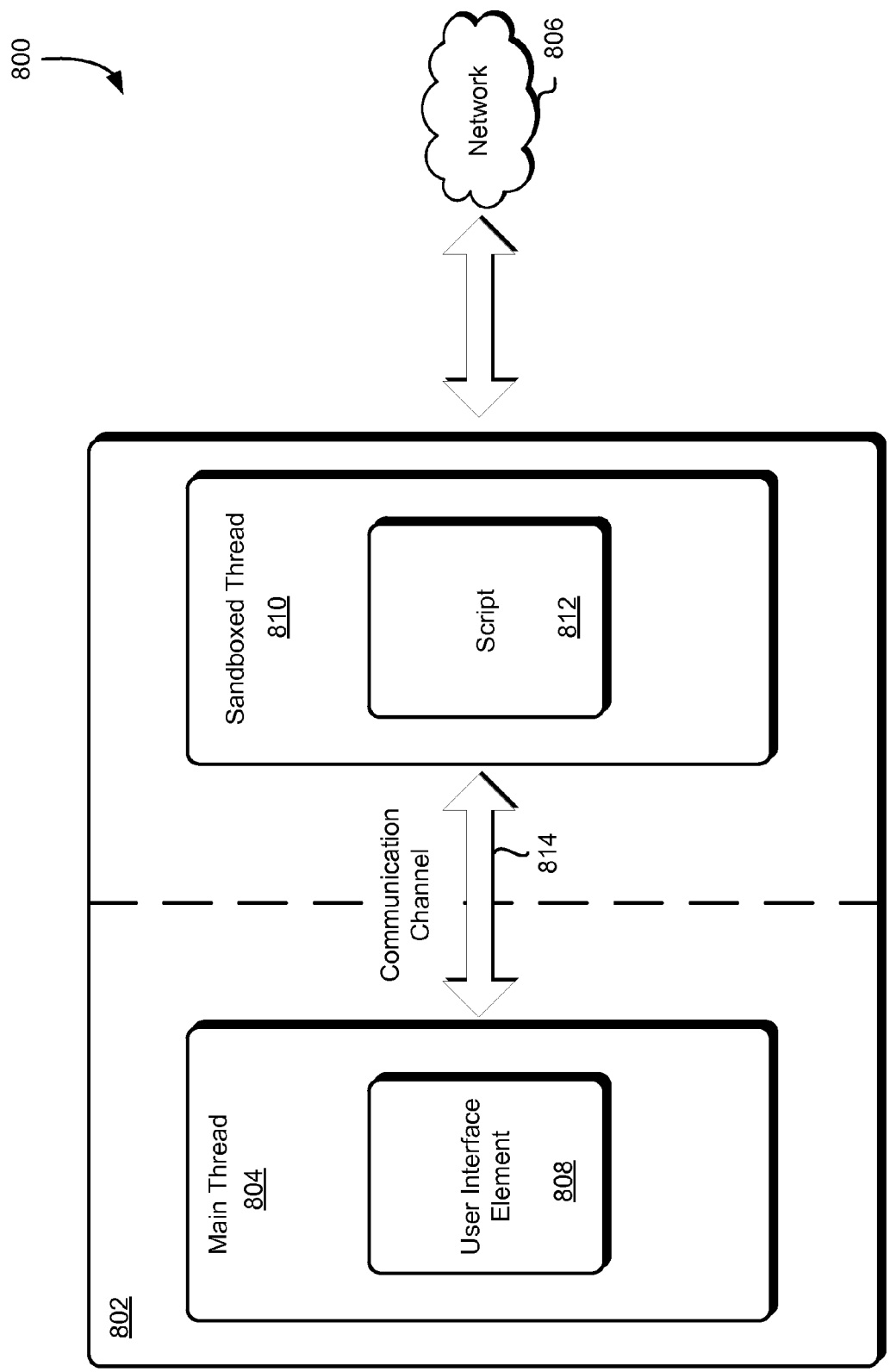
FIG. 8 is an environment illustrating a sandboxed thread for executing a script useable to obtain data for display in various user interface elements in accordance with an embodiment.

FIG. 8 illustrates an environment 800 in which an application 802, of a computing device, may provide a user with access to a scripting platform implemented by a scripting service of a computing resource service provider. Furthermore, the application 802 may execute a script 812 in a sandboxed thread 810 in order to isolate execution of the script 812 from the main thread 804. The main thread 804 may be an execution of the smallest sequence of programmed instructions that may be managed independently by a scheduler of an operating system. The main thread 804 may be responsible for implementing user interface elements 808 of application 802. For example, the main thread 804 may, when executed by a processor of the computing device, cause the computing device to generate a user interface as illustrated in FIG. 1. Once the application 802 receives a command to execute a script 812 the application 802 may cause execution of the script 812 in the sandboxed thread. In various embodiments, the script 812 is executed using list processing techniques. List processing may include a list of executable instructions, including for example an abstract data structure, which may be used to calculate specified variables in a certain order. For example, the script 812 may be executed such that information for a particular API call is return prior to generating a user interface element configured to include information obtained as a result of executing the particular API call.

The sandboxed thread 810 may process, in parallel to the main thread 804, enabling the computing device to execute both the main thread 804 and the sandboxed thread 810. The sandboxed thread 810 may be an entity capable of obtaining and processing the script 812 including sending and receiving information over a network 806 as well as a communications channel 814 between the main thread 804 and the sandboxed thread 810. In some embodiments, the sandboxed thread 810 may be implemented as a hardware device or component of the computing device. For example, the sandboxed thread 810 may be one or more routines implemented in the software or firmware of a hardware device, or may be a virtual computing system or service, such as that which is provided by the computing resource service provider, described in further detail below. The sandboxed thread 810 may be isolated from other components of an implementing system, such as electrically, physically, virtually, or the like. For example, the sandboxed thread 810 may be implemented as a web worker, as defined by the World Wide Web Consortium (W3C) and the Web Hypertext Application Technology Working Group (WHATWG).

The sandboxed thread 810 may be a JavaScript script executed from an HTML page that runs in the background, independently of other user-interface scripts that may also have been executed from the same HTML page. The sandboxed thread 810 may be scripts or other executable code that are not interrupted by user-interface scripts (scripts that respond to mouse clicks, keyboard events, or other user interactions). In this manner, the sandboxed thread 810 may be prevented from being interrupted by user activities and enable web pages to remain responsive to user interactions while at the same time allowing the script 812 to be executed. For example, the sandboxed thread 810 may perform a computationally expensive task without interrupting the user interface. The sandboxed thread 810 may allow for concurrent execution of the browser threads, such as the main thread 804, and one or more JavaScript threads running in the background. The application may spawn or otherwise cause the sandboxed thread 810 to be executed as an operating system level thread. The sandboxed thread 810 may include controlled communication points with other threads and other computer systems. For example, as illustrated by FIG. 8, the sandboxed thread 810 may be limited to a single communications channel 814 to the main thread 804. Additionally, the sandboxed thread 810 may have no access to non-thread safe components or the Document Object Model (DOM) and may pass data in and out of a thread only through serialized objects. Data passed between the main thread 804 and the sandboxed thread 810 may be copied and not shared. Objects are serialized prior to providing the objects to the sandboxed thread 810, and subsequently, de-serialized by the sandboxed thread 810. The main thread 804 and the sandboxed thread 810 may not share the same instance, and as a result a duplicate object may be created in both the main thread 804 and the sandboxed thread 810.

The sandboxed thread 810 may transmit data by passing messages or making AJAX calls, but may otherwise be isolated in order to prevent the sandboxed thread 810 from making changes to the DOM. In various embodiments, the DOM is a cross-platform and language-independent convention for representing and interacting with objects in HTML, XHTML, and XML documents. The nodes of every document may be organized in a tree structure, called the DOM tree. Objects in the DOM tree may be addressed and manipulated by using methods on the objects. Furthermore, the public interface of a particular DOM may be specified in an API associated with the particular DOM. The sandboxed thread 810 may generate API calls (i.e., in the form of an AJAX call) then process the data received from the API call. Once the data is processed the sandboxed thread 810 may provide the process data to the main thread 804 of the application 802. In this way the script can be executed in the sandboxed thread 810 and be isolated from the rest of the application 802. Furthermore, the sandboxed thread 810 may have access to a set of functions or API calls that enable the sandboxed thread 810 to alter the DOM. For example, the script 812 may include API calls configured to modify one or more user interface elements of the main thread 804. The sandboxed thread 810 may execute the API calls and as result may pass commands or other information to the main thread 804 configured to cause the main thread 804 to modify the DOM. In various embodiments, the main thread 804 includes logic to determine whether the commands to modified the DOM are allowed or indicated as allowable in a whitelist.

Figure 9:
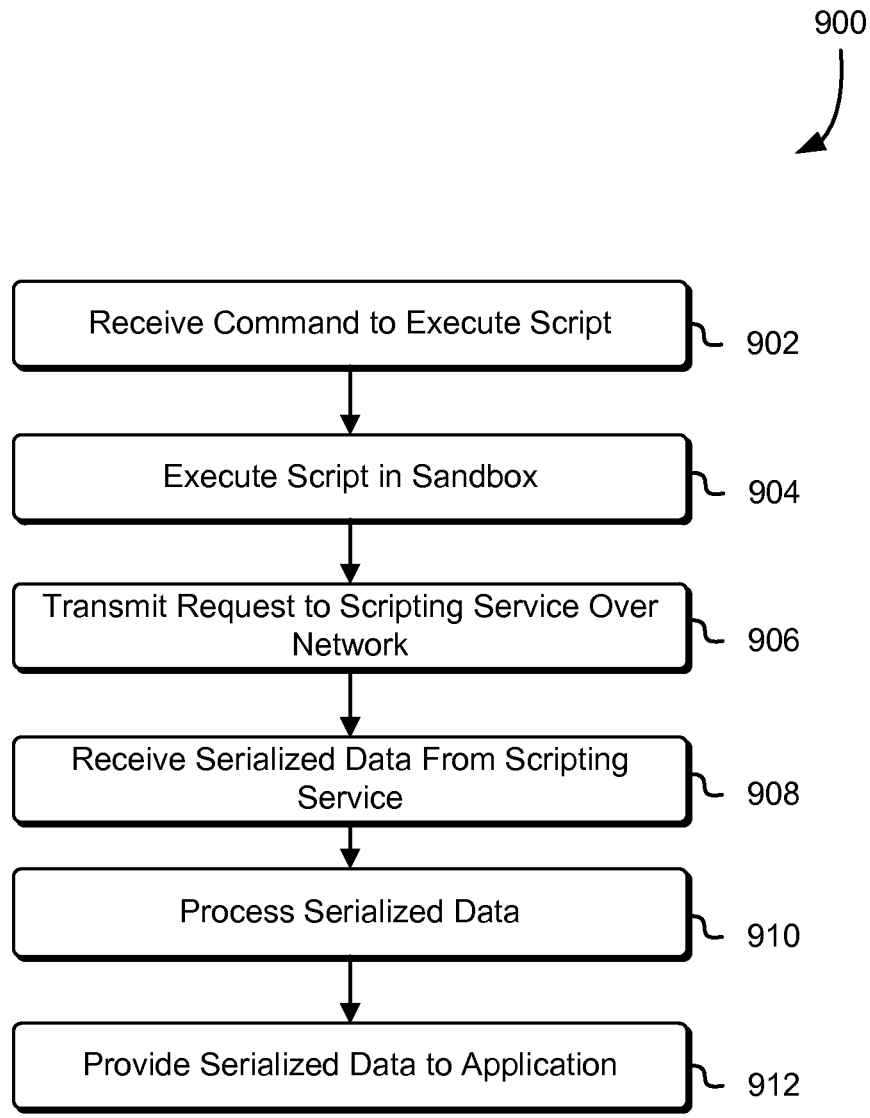
FIG. 9 illustrates an example process for a sandboxed thread to execute a script useable to obtain data for display in various user interface elements in accordance with an embodiment.

FIG. 9 shows an illustrative example of the process 900 which may be used to execute a script using a scripting platform implemented by a scripting device in accordance with an embodiment. The process 900 may be performed by any suitable system, such as the user computing device described above in connection with FIG. 4. Returning to FIG. 9, in an embodiment, the process 900 includes receiving a command to execute a script 902. As described above, the user may select, modify, or generate a script using the scripting service and then execute the script by selecting a user interface element of the application providing the user with access to the scripting service. The application may then cause the script to be executed in a sandbox 904. For example, the application may instantiate an operating system level thread of the application isolated from a main thread of the application as described above. The script may then be provided to the sandbox for execution. As a result of executing the script, the thread may transmit a request to the scripting service over a network 906. For example, the script may include one or more library calls configured to generate API calls to be transmitted to the scripting service. The scripting service may receive the API call, as described above, and process the API call and/or provide the API call to a service indicated in the API call.

The application or sandbox may then receive serialized data from the scripting service 908. As described above, the scripting service may receive data from another service as a result of the API call, and the data may then be serialized before providing the data to the application in response to the request. Once received, the sandbox may process the serialized data 910. Processing the serialized data may include de-serializing the data and/or determining additional information based at least in part on the serialized data. For example, the serialized data may include network traffic information of a computing instance and processing the serialized data may include calculating a maximum network throughput the computing instance based at least in part on the serialized data. The processed data may then be provided to the application 912. For example, as described above, the sandboxed thread may provide the main thread of the application with a copy of serialized data object.

Figure 10:
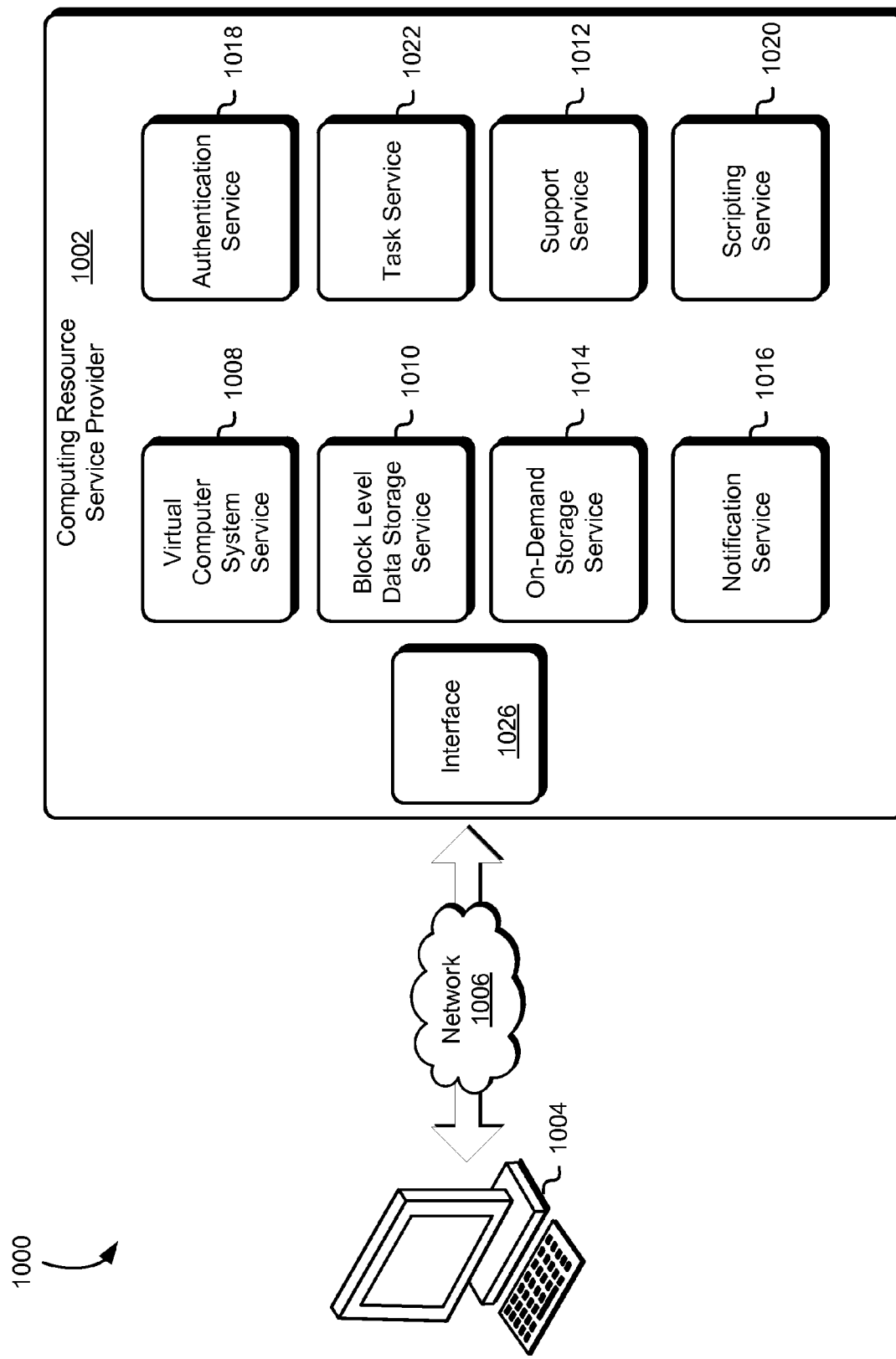
FIG. 10 is an environment illustrating various services offered by a computing resource service provider in accordance with an embodiment.

FIG. 10 shows an example of a user connected to a computing resource service provider in accordance with at least one embodiment. The computing resource service provider 1002 may provide a variety of services to the user 1004 and the user 1004 may communicate with the computing resource service provider 1002 via an interface 1026, which may be a web services interface or any other type of customer interface. While FIG. 10 shows one interface 1026 for the services of the computing resource service provider 1002, each service may have its own interface and, generally, subsets of the services may have corresponding interfaces in addition to or as an alternative to the interface 1026. The user 1004 may be an individual that utilizes the services of the computing resource service provider 1002. As shown in FIG. 10, the user 1004 may communicate with the computing resource service provider 1002 through a network 1006, whereby the network 1006 may be a communication network, such as the Internet, an intranet or an ISP network. Some communications from the user 1004 to the computing resource service provider 1002 may cause the computing resource service provider 1002 to operate in accordance with one or more embodiments described herein or a variation thereof.

The computing resource service provider 1002 may provide various computing resource services to its customers. The services provided by the computing resource service provider 1002, in this example, include a virtual computer system service 1008, a block-level data storage service 1010, an on-demand data storage service 1014, a notification service 1016, an authentication service 1018, a task service 1022, a support service 1012, and a scripting service 1020. It is noted that not all embodiments described herein include the services 1008-1024 described with reference to FIG. 10 and additional services may be provided in addition to or as an alternative to services explicitly described herein. As described herein, each of the services 1008-1024 may include one or more web service interfaces that enable the user 1004 to submit appropriately configured API calls to the various services through web service requests. In addition, each of the services may include one or more service interfaces that enable the services to access each other (e.g., to enable a virtual computer system of the virtual computer system service 1008 to store data in or retrieve data from the on-demand data storage service 1014 and/or to access one or more block-level data storage devices provided by the block level data storage service 1010).

The virtual computer system service 1008 may be a collection of computing resources configured to instantiate virtual machine instances on behalf of the user 1004. The user 1004 may interact with the virtual computer system service 1008 (via appropriately configured and authenticated API calls) to provision and operate virtual computer systems that are instantiated on physical computing devices hosted and operated by the computing resource service provider 1002. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 1008 is shown in FIG. 10, any other computer system or computer system service may be utilized in the computing resource service provider 1002, such as a computer system or computer system service that does not employ virtualization or instantiation and instead provisions computing resources on dedicated or shared computers/servers and/or other physical devices.

The block-level data storage service 1010 may comprise one or more computing resources that collectively operate to store data for a user 1004 using block-level storage devices (and/or virtualizations thereof). The block-level storage devices of the block-level data storage service 1010 may, for instance, be operationally attached to virtual computer systems provided by the virtual computer system service 1008 to serve as logical units (e.g., virtual drives) for the computer systems. A block-level storage device may enable the persistent storage of data used/generated by a corresponding virtual computer system where the virtual computer system service 1008 may only provide ephemeral data storage.

The computing resource service provider 1002 further includes an on-demand data storage service 1014. The on-demand data storage service 1014 may be a collection of computing resources configured to synchronously process requests to store and/or access data. The on-demand data storage service 1014 may operate using computing resources (e.g., databases) that enable the on-demand data storage service 1014 to locate and retrieve data quickly, so as to allow data to be provided in responses to requests for the data. For example, the on-demand data storage service 1014 may maintain stored data in a manner such that, when a request for a data object is retrieved, the data object can be provided (or streaming of the data object can be initiated) in a response to the request. As noted, data stored in the on-demand data storage service 1014 may be organized into data objects. The data objects may have arbitrary sizes except, perhaps, for certain constraints on size. Thus, the on-demand data storage service 1014 may store numerous data objects of varying sizes. The on-demand data storage service 1014 may operate as a key value store that associates data objects with identifiers of the data objects that may be used by the user 1004 to retrieve or perform other operations in connection with the data objects stored by the on-demand data storage service 1014.

In the environment illustrated in FIG. 10, a notification service 1016 is included. The notification service 1016 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 1016 may provide notifications to clients using a "push" mechanism without the need to periodically check or "poll" for new information and updates. The notification service 1016 may further be used for various purposes such as monitoring applications executing in the virtual computer system service 1008, workflow systems, time-sensitive information updates, mobile applications, and many others.

As illustrated in FIG. 10, the computing resource service provider 1002, in various embodiments, includes an authentication service 1018. The authentication service 1018, in an embodiment, is a computer system (i.e., collection of computing resources) configured to perform operations involved in authentication of users of the customer. For instance, one of the services 1008-1016 and 1020-1024 may provide information from a user to the authentication service system 1018 to receive information in return that indicates whether the user requests are authentic.

The computing resource service provider 1002, in various embodiments, is also equipped with a task service 1022. The task service 1022 is configured to receive a task package from the user 1004 and enable executing tasks as dictated by the task package. The task service 1022 may be configured to use any resource of the computing resource service provider 1002, such as one or more instantiated virtual machines or virtual hosts, for executing the task. The task service 1022 may configure the one or more instantiated virtual machines or virtual hosts to operate using a selected operating system and/or a selected execution application in accordance with a requirement of the user 1004.

The computing resource service provider 1002, in various embodiments, also provides a support service 1012. The task service 1022 is configured provide customers of the computing resource service provider with customer support and troubleshooting. For example, the support service 1012 may provide the users 1004 with virtual computer systems configured to execute an application configured to provide the user with access to the scripting platform implemented by the scripting service 1020. The scripting service 1020 may be configured to provide a scripting platform as described above. The scripting platform may enable the user 1004 to interact with various scripts maintained by the scripting service and/or generate new scripts. The scripts, when executed, may cause scripting service to obtain information from the services 1008-1018 and 1022 of the computing resource service provider 1002. Furthermore, the scripting service may serialize the obtained information and provide the serialized information to the user 1004.

Figure 11:
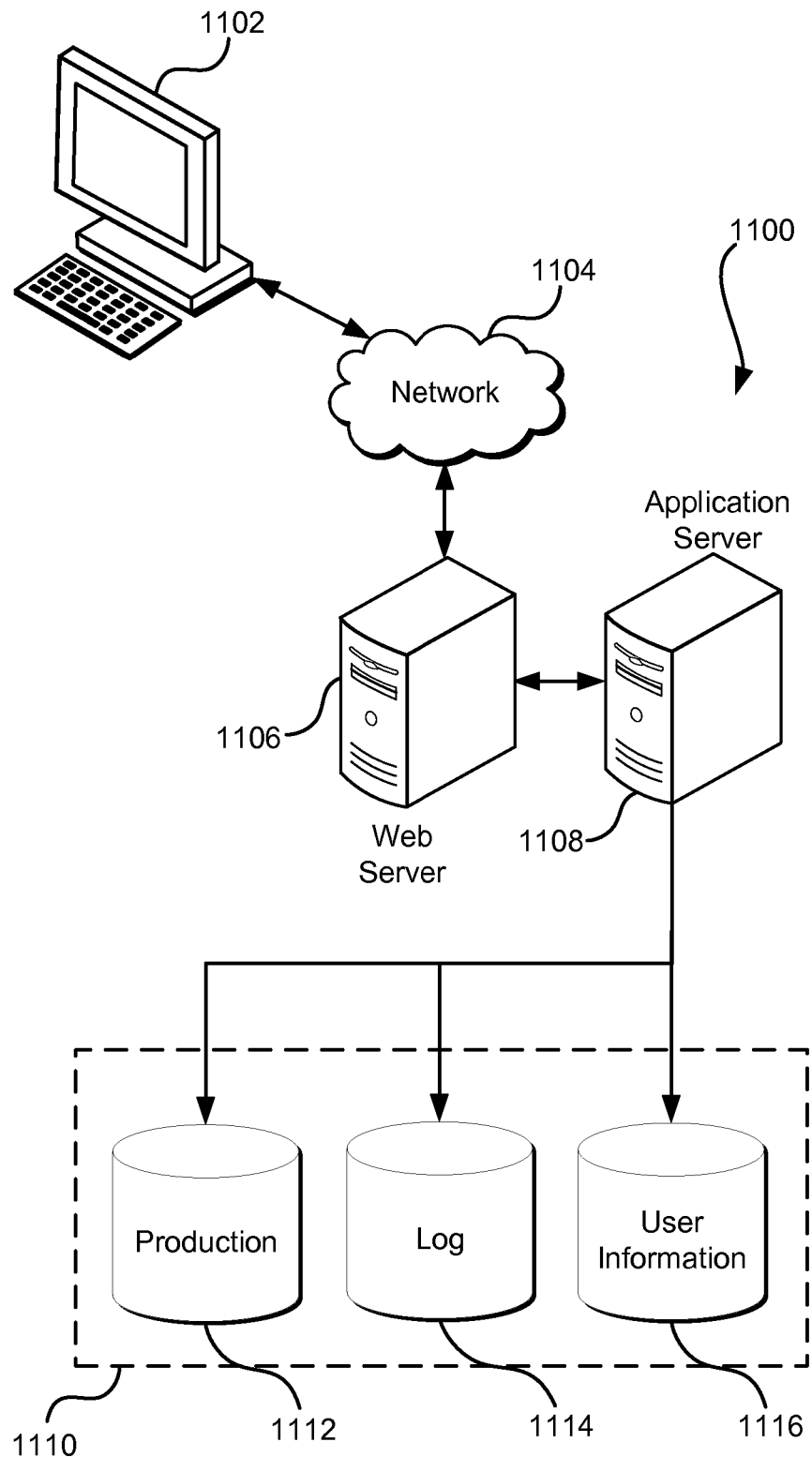
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
receiving an indication of at least one script recommended to a user based at least in part on a set of instructions included in the at least one script, the set of instructions, when executed, configured to cause an application programming interface call to be transmitted to a scripting service;
obtaining a script from the scripting service, the scripting service is part of a network implemented by a computing resource service provider;
modifying the script based at least in part on a user input received from a computer system of the one or more computer systems;
providing the modified script to scripting service such that the scripting service persists the modified script in association with the user responsible for providing the modified script;
generating the application programming interface call including additional user input as a result of executing the script;
providing the application programming interface call to the scripting service;
obtaining serialized data in response to the provided application programming interface call;
receiving a selection a user interface element configured to display data obtained from the scripting service; and
generating a user interface including the selected user interface element, where the user interface element is based at least in part on the serialized data.

2. The computer-implemented method of claim 1, wherein the computer-implemented method further includes determining a customer account and an operation indicated in the provided application programming interface call is not included in a blacklist, where the blacklist indicate a set of customer accounts and operation not to provide serialized data in response to.

3. The computer-implemented method of claim 1, wherein the computer-implemented method further includes providing the modified script to at least one other user of the scripting service, where the at least one other user is not responsible for the modified script.

4. The computer-implemented method of claim 1, wherein receiving an indication of the at least one script recommended to the user further includes receiving an indication of a number of times the at least one script has been executed.

5. A system, comprising:
one or more processors;
memory with instructions that, when executed by the one or more processors, cause the system to:

obtain a script from a scripting service;
as a result of executing the script, obtain additional user input associated with a user interface element, where the user interface element is selected from a set of user interface elements configured to receive additional user input and display data obtained from the scripting service;
modify the script based at least in part on the additional user input to generate a modified script;
provide the modified script to the scripting service to persist the modified script;
provide a request including the obtained additional user input to the scripting service;
obtain serialized data in response to the request; and
generate the user interface element based at least in part on the serialized data.

6. The system of claim 5, wherein the memory further includes instructions that, when executed by the one or more processors, cause the system to generate audit information based at least in part on the request.

7. The system of claim 5, wherein the memory further includes instructions that, when executed by the one or more processors, cause the system to provide metric information associated with a user responsible for providing the request.

8. The system of claim 7, wherein the memory further includes instructions that, when executed by the one or more processors, cause the system to delay at least a portion of a processing of the request based at least in part on the provided metric information associated with the user.

9. The system of claim 5, wherein the memory further includes instructions that, when executed by the one or more processors, cause the system to receive an indication that the request has been authenticated based at least in part on a user responsible for providing the request.

10. The system of claim 5, wherein the memory further includes instructions that, when executed by the one or more processors, cause the system to receive a user input and modify the script based at least in part on the user input prior to execution of the script.

11. The system of claim 5, wherein the memory further includes instructions that, when executed by the one or more processors, cause the system to obtain an authentication token configured to authenticate the request to the at least one other service, where the authentication token is associated with a customer of a computing resource service provider.

12. The system of claim 5, wherein the memory further includes instructions that, when executed by the one or more processors, cause the system to:
obtain the script, where the script includes a set of executable instructions; and
execute the script by at least executing the set of executable instructions as a result of receiving a command.

13. A non-transitory computer-readable storage medium having stored thereon executable instructions that, when executed by one or more processors of a computer system, cause the computer system to at least:

obtain a script from a scripting service;
modify the script based at least in part on a user input to generate a modified script;
provide the modified script to the scripting service;
provide a request to the scripting service as a result of the computer system executing the modified script;
obtain serialized data corresponding to the provided request;
receive a selection of a user interface element from a set of user interface elements configured to display data obtained from the scripting service; and
generate the user interface element based at least in part on the serialized data and the received selection of the user interface element.

14. The non-transitory computer-readable storage medium of claim 13, wherein the instructions further comprise instructions that, when executed by the one or more processors, cause the computer system to receive, through a user interface, selection of the script from a user of the scripting service.

15. The non-transitory computer-readable storage medium of claim 14, wherein the instructions further comprise instructions that, when executed by the one or more processors, cause the computer system to transmit a second request to a scripting service, the request configured to cause the scripting service to store the script.

16. The non-transitory computer-readable storage medium of claim 14, wherein the instructions further comprise instructions that, when executed by the one or more processors, cause the computer system to obtain, from the scripting service, a description of the script and at least one attribute of the script, where the at least one attribute of the script is determined by the scripting service based at least in part on a set of executable instructions included in the script.

17. The non-transitory computer-readable storage medium of claim 13, wherein the instructions further comprise instructions that, when executed by the one or more processors, cause the computer system to provide a user rating of the script to a scripting service.

18. The non-transitory computer-readable storage medium of claim 13, wherein the instructions that cause the computer system to generate the user interface element further include instructions that cause the computer system to determine a visualization structure for the serialized data defined by the selection of the user interface element.

19. The non-transitory computer-readable storage medium of claim 13, wherein the instructions further comprise instructions that, when executed by the one or more processors, cause the computer system to provide to a user a scripting platform configured as a single-page application.

20. The non-transitory computer-readable storage medium of claim 13, wherein the instructions further comprise instructions that, when executed by the one or more processors, cause the computer system to obtain an authentication token from an authentication service of a computing resource service provider.

* * * * *